Figure 1:
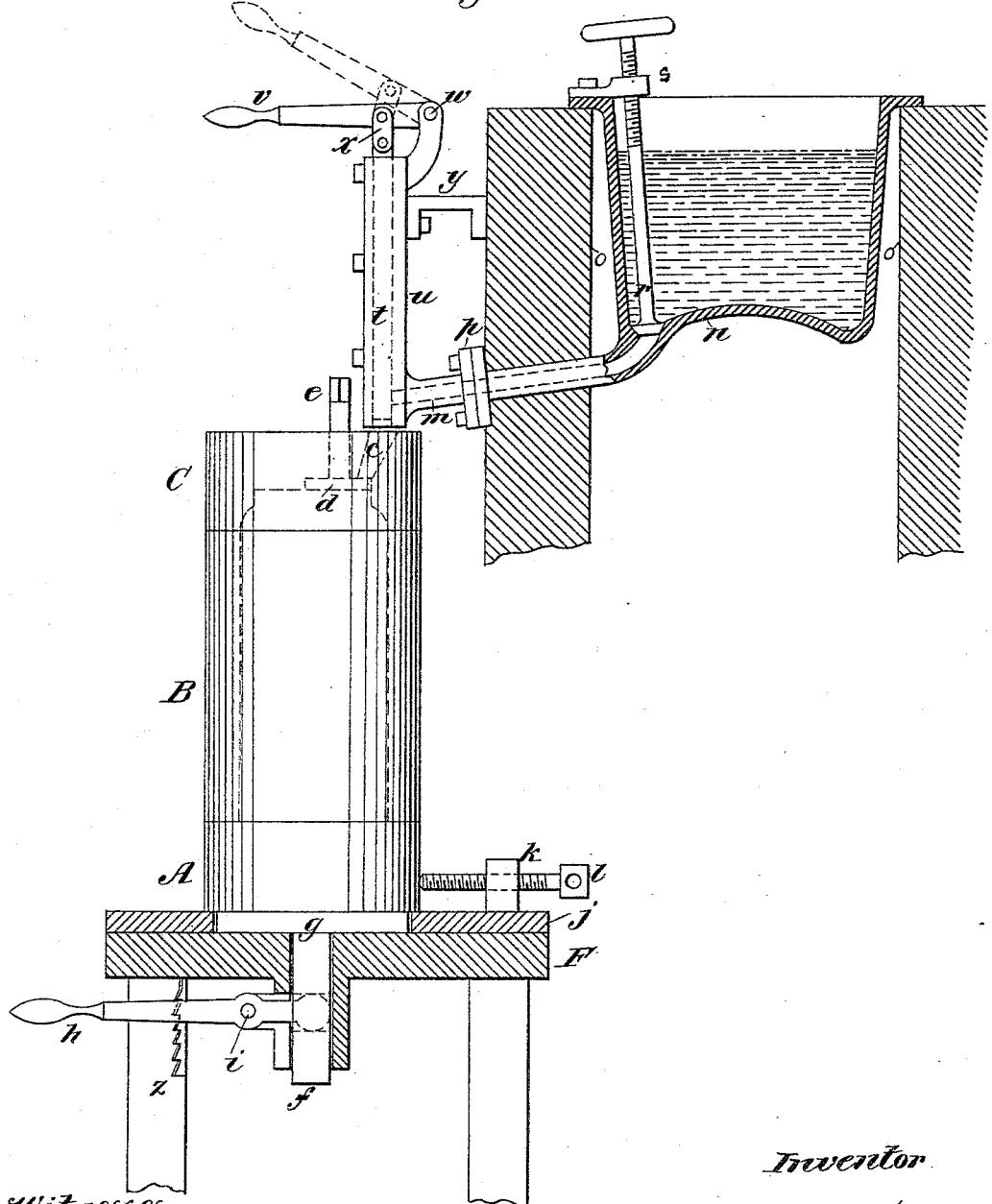

(No Model.) 2 Sheets—Sheet 1.

G. W. WICKS.
METHOD OF MAKING PLUMBERS' TRAPS.

No. 359,757. Patented Mar. 22, 1887.

Witnesses
H. F. Parker.
W. E. Bowen.

Inventor
George W. Wicks,
By J. Ell Bowen
Attorney.

(No Model.) 2 Sheets—Sheet 2.

G. W. WICKS.
METHOD OF MAKING PLUMBERS' TRAPS.

No. 359,757. Patented Mar. 22, 1887.

Witnesses.
H. F. Parker.
W. E. Bowen.

Inventor.
George W. Wicks,
By J. E. M. Bowen
Attorney

UNITED STATES PATENT OFFICE.

GEORGE W. WICKS, OF BROOKLYN, NEW YORK, ASSIGNOR TO ARCHIBALD E. McKECHNIE, OF LYNN, MASSACHUSETTS.

METHOD OF MAKING PLUMBERS' TRAPS.

SPECIFICATION forming part of Letters Patent No. 359,757, dated March 22, 1887.

Application filed February 10, 1886. Renewed December 3, 1886. Serial No. 220,589. (No model.)

*To all whom it may concern:*

Be it known that I, GEORGE W. WICKS, a citizen of the United States, and a resident of Brooklyn, in the county of Kings and State of New York, have invented certain new and useful Methods of Making Plumbers' Traps, of which the following is a specification.

This invention relates to modes of producing what are known as "plumbers' traps," and especially that type of trap which consists of an elongated cylindrical vessel having a contracted mouth provided with a female screw-threaded nut and a screw-threaded cover.

The style of trap in question has its body portion of lead and its screw-threaded nut within the neck and its cover of brass. Heretofore the body portions of these traps have been usually made by hand by the tools commonly employed for giving form to hollow bodies in lead; but the hand-made traps are not only expensive to produce, but are unreliable, because of the objectionable solder joints which are necessarily involved in the construction of the traps that are made by hand. These objections have served as obstacles to the introduction into general use of this very desirable type of device for furnishing a liquid seal between soil and drain pipes and such receptacles as water-closets, sinks, &c.

The object of the present invention is to improve the art of lead-trap-making by the introduction of a new mode of operation, both as regards the production of the trap-body and the insertion of the brass female nut in the mouth of the trap.

In separate applications for patents executed by me of even date with the execution of this application I have fully described and claimed the apparatus by which I propose to practice the herein-described method, and also the product of the method and apparatus, and reference is here made to said applications for an explicit explanation of the inventions which they set forth.

My present invention embraces a mode by which the surface of the trap-body is rendered homogeneous and free from porosity, and at the same time is more smoothly finished than is the trap as ordinarily constructed, all of which desirable qualities tend to make the traps produced by my method more reliable in service and a more merchantable commodity than any traps of like design now found in the market.

I have set forth in the claims at the end of this specification the invention for which I desire protection.

Figure 2:
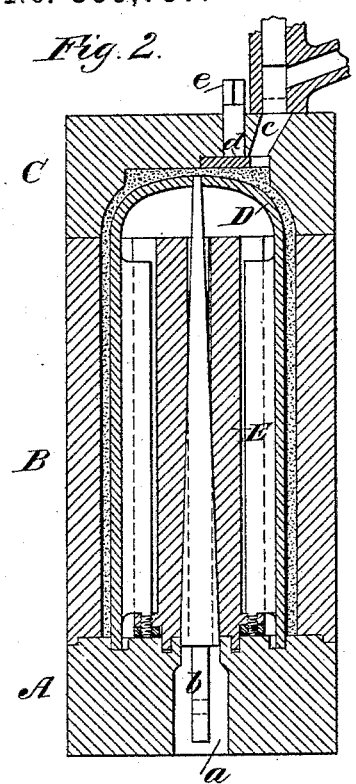
Figure 3:
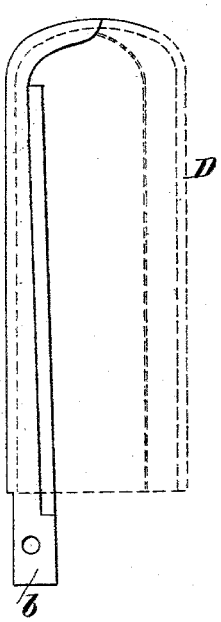
Figure 4:
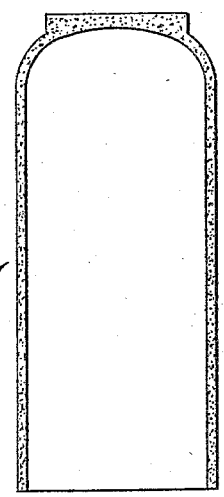
Figure 5:
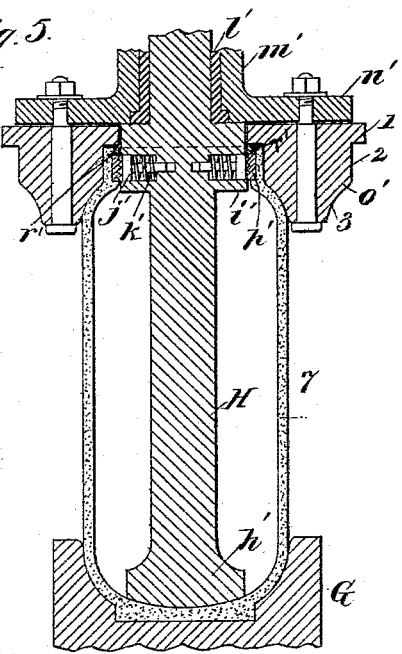
Figure 6:
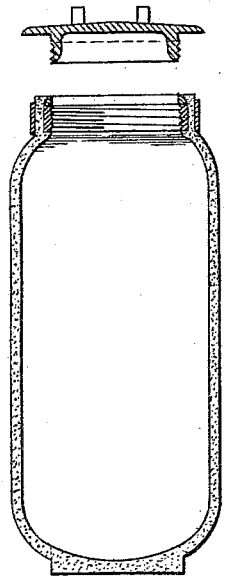

In the accompanying drawings, which form a part of this description, and in which like features are indicated by like letters, Figure 1 is a vertical sectional view, partly in elevation, illustrating a means whereby a trap-body is produced by the practice of my method. Fig. 2 is a vertical section of the molding mechanism shown in elevation in Fig. 1. Fig. 3 is a view in elevation of the core-expanding wedge, showing the core in dotted lines. Fig. 4 is a longitudinal section of the trap-body as it comes from the molding mechanism. Fig. 5 is a vertical sectional view of the trap and sufficient of the neck-shaping mechanism to show the method of completing the product of the molding mechanism and inserting the screw-threaded nut and washer, and Fig. 6 is a longitudinal sectional view of the perfected trap after it has left the neck-shaping mechanism.

The molding mechanism which I by preference employ in carrying out my method is that shown in Fig. 2, and the construction of which is particularly set forth in one of the applications filed by me in the United States Patent Office the same date with the filing of this application. The molding mechanism in question, as will be seen by reference to Fig. 2, consists of an outer case horizontally divided into three sections, A B C. These parts are cylindrical, and are of cast-iron, and will be made of proportions corresponding to the size of the trap-body to be cast. They will be secured together by suitable easily-manipulated fastening devices, and the joint between the base A and intermediate section, B, will be formed by a depression in one part and a projection on the other, so as to insure a closely-fitting connection. The vertical slot *a* in the base A is to accommodate the lower end of the expanding-wedge *b*, which is to have connected to it a lever for elevating and depressing it.

The top C is provided with an opening, c, of the shape shown, for inserting the molten metal within the mold, and with a steel cut-off, d, which is circular and provided with a slot for the passage of the molten metal. Said cut-off is secured to the spindle e, whereby it may be rotated to smoothly separate the lead at the lower end of the opening c. The interior of the top C of the mold is made curved on its sides and flat in its bottom, as shown, so as to give the desired conformation to the exterior of the bottom of the trap-body. The interior of the intermediate section B is cylindrical in outline.

The core D is of brass, and is made in longitudinal semi-cylindrical sections, which are connected to the cast-iron core-mandrel E in such a manner that when the wedge b, which fits between two of the core-sections, and is guided in a slot in the mandrel, and is so shaped at its upper end as to fill out the surface of the dome-shaped top of the core, is drawn down or depressed, the sections of the core contract sufficiently to compensate for the shrinkage of the lead trap-body in cooling.

In Fig. 1 the outer shell of the molding mechanism is shown in side elevation. In this view, F is a table of suitable dimensions and construction, the top of which has a central opening, in which is placed and properly guided the shank f of the plate g, to which shank is pivotally connected a lever, h, having a fixed bearing at i. The top of the table is provided with a plate, j, having a central opening, within which is loosely placed the metallic plate g, and upon the surface of plate j, near one end, is a lug, k, provided with a set-screw, l.

The molding machinery is placed in position on table F immediately over the loose plate g, in which position the mouth of the opening c of the mold coincides with the outlet m of the melting-pot n. The pot n is of the usual construction, and is set in the masonry o o over a furnace. (Not shown.) The outlet m of the pot n extends through the masonry, and is braced at p by any suitable means. The outlet is inclined, as shown, to afford a free flow to the molten metal, and the pot n is provided with a valve, r, whose rod is secured to the rim of the pot at s. During the operation of molding, the valve is permanently raised, and the cut-off for the molten metal is provided by the plunger t, which is square in cross-section, and which may be reciprocated in the cylinder u by the lever v, pivoted at w, and connected to the top of said plunger by the link x, as shown. The cylinder u is braced to the masonry at y, and is connected to the outlet m, so that the molten metal from the latter may flow into the lower end of the former, as shown in dotted lines. In the position shown the plunger is down, closing the outlet at the end of the cylinder u. In using this part of the apparatus the molding mechanism, being in proper condition, is placed upon the table F, as shown, and its mouth c is brought in proper alignment with the outlet of the cylinder u, and maintained in that position by means of the set-screw l. In this condition of the parts the lever h is depressed, causing the shank f and its connected plate to rise. This movement causes the molding mechanism to be elevated until its opening c is in close contact with the end of the outlet m, and the locking of the lever h in the ratchet z secures the apparatus in this condition. The valve r having previously been opened, the elevation of lever v permits the molten metal to flow into the mold, and when it is full, and preliminary to operating the cut-off d, already described, the lever v is suddenly depressed, causing the plunger t to descend with the effect of compacting the lead within the mold before it has sensibly cooled.

I have found by experiments that the effect of a sudden blow upon the molten metal within the mold while it is congealing, but before it has fully set, is to increase the density of the metal and close its pores, thus giving a smooth finish to the article operated upon, and hence producing a more reliable article and enhancing the merchantable qualities of the same.

In Fig. 4 is illustrated the form of the trap-body as it comes from the molding mechanism.

The mechanism which I prefer to employ in practicing my mode of finishing the trap as it comes from the molding mechanism is illustrated in Fig. 5. Referring to this view, the letter G indicates a cast-iron die, whose interior is provided with curved side walls and with a flat bottom, and conforms exactly to the contour of the exterior of the bottom of the trap-body, so as to furnish a substantial rest therefor while the process of finishing the mouth of the trap is going on.

The letter H represents a cast-iron follower of proportions corresponding to the size of the trap-body to be operated upon. At its lower end it is provided with a foot, $h'$, with a curved bottom conforming to the curvature of the interior of the bottom of the trap, but sufficiently small to enable its withdrawal from the trap when the mouth of the latter has been perfected. The purpose of the foot $h'$ is to maintain the trap-body firmly in an upright position while undergoing operation by the mouth-shaping mechanism.

At a proper position on the follower, intermediate between its foot and upper end, there is formed a cylindrical enlargement, $i'$, somewhat less in diameter than the diameter the mouth of the trap will have when perfected. The circumference of the enlargement $i'$ is bored out at three equidistant points for the reception of buttons $j'$ and springs $k'$. The buttons $j'$ fit loosely in said depressions, but are prevented from falling out by pins fixed in the walls of the depressions and operating in grooves in the heads of the buttons.

Above the enlargement $i'$ is secured a sleeve, $l'$, upon which is fitted a collar and plate, $m'$ $n'$. A bevel-gear is to be connected to the collar $m'$, by which said collar is caused to rotate with the effect of giving an independent rotary movement to each of the rollers o'. The function of the rollers o' (there may be five, more or less) is to shape the mouth of the trap and compress the lead around the female screw-threaded nut p' and metallic washer r'. The rollers o' are so formed upon their exterior as to give the required finish and form to the neck of the trap. The said rollers are attached to the plate n' by means of headed bolts, which pass longitudinally through their centers and through the plate n', and are held in place by means of nuts upon their screw-threaded upper ends. The series of rollers are revolved with the revolution of the collar and plate m' n', and, besides, each is revoluble upon its own axis.

The conformation of roller o' is clearly shown in Fig. 5, the flange 1 at its top being of a width sufficient to overlap the top edge of the trap, and its surface 2, just below the flange 1, being cylindrical and perpendicular to properly shape the exterior of the neck of the trap, while below the perpendicular portion 2 the roller is curved inwardly at 3 to properly shape the shoulders of the trap below its neck.

The manner of using this mechanism is as follows: The trap-body 7, as it comes from the molding mechanism in its incomplete form, is placed in the die G, the follower H being elevated so that its foot h' is above the upper end of the trap-body. In lowering the follower into the trap the rollers o' are slid up upon the sleeve l', in order that when the foot of the follower is firmly seated in the bottom of the trap the rollers are away from contact with the trap's mouth. In this position the enlargement i' occupies a position directly on a line with the neck of the trap-body. Before the follower H is lowered into the trap-body its enlargement i' is provided with a female screw-threaded nut, p', and a metallic washer, r', which is done by springing back the buttons j' and slipping the nut and washer onto the enlargement i'. The springs behind the heads of the buttons j' press outwardly, and thus maintain the nut and washer in the proper position upon the enlargement i'. Thus equipped, the follower H is lowered into the trap-body in the manner already explained, and the collar and plate are caused to revolve with the effect of carrying the revoluble rollers around the mouth of the trap-body, by which action the desired conformation is given to the neck of the trap, and at the same time the lead of the trap's mouth is firmly compressed upon the female nut p' and the metallic washer r', and the top edge of the mouth of the trap is smoothed and compressed.

In using the apparatus herein described the support for the molding mechanism will be arranged in convenient proximity to the mouth shaping and finishing mechanism, so that the process of manufacturing may be carried on as expeditiously as if the several parts of the apparatus were mounted upon a single frame.

From the foregoing description it will be seen that while the trap-body is cast its neck is fashioned by pressure, in the act of effecting which operation the screw-threaded female nut and re-enforcing washer are inserted within the mouth of the neck.

The operation of compacting the trap-body while the metal composing it is in a semi-molten state, or before it has sensibly set, may be carried out by means other than those which I have shown, and which, by preference, I shall use. A comparatively slight thrust upon the metal confined in the mold, at a proper stage in the process of its congelation, has the effect of consolidating the constituent particles of the structure, thus somewhat increasing its density and avoiding the formation of blow-holes in the trap-body, which will have to some extent the appearance of having been die-drawn. The manipulation of shaping the mouth of the trap by pressure-rolls further compacts the metal at that part of the structure and improves its finish and texture.

My mode of inserting the female nut by pressure effects a more reliable union between the neck of the trap and the nut than is ordinarily accomplished by any casting process, since in casting the metal upon the ring defects in the joints, due to shrinkage, blow-holes, and the like, are liable to exist.

Having thus described my invention, what I claim as new, and desire to secure by Letters Patent, is—

1. The herein-described method of manufacturing soft-metal plumbers' traps, which consists in first casting the body of the trap in a mold, removing the same from the mold, placing the female nut in position within the trap's mouth, and then subjecting its mouth to cold pressure, whereby its neck is fashioned and the female nut is firmly secured therein, substantially as set forth.

2. As an improvement in the art of manufacturing soft-metal plumbers' traps, the method of compacting the metal composing the trap-body and improving the finish of the trap's surface, which consists in subjecting the metal within the mold to impact before the process of congelation has been completed, substantially as set forth.

3. As an improvement in the art of manufacturing soft-metal plumbers' traps, the method of securing the female nut and supporting-washer within the neck of the trap, which consists in properly supporting the nut and washer within the mouth of the trap, and by cold pressure uniting the nut and washer with the neck of the trap, substantially as set forth.

Signed at New York, in the county of New York and State of New York, this 31st day of December, A. D. 1885.

GEO. W. WICKS.

Witnesses:
HUGO KOELKER,
J. E. M. BOWEN.